United States Patent
D'Angelo et al.

(10) Patent No.: US 12,205,493 B2
(45) Date of Patent: Jan. 21, 2025

(54) METHODS AND SYSTEMS FOR PRESENTING TOPIC-SPECIFIC BIOGRAPHICAL INFORMATION OF A USER

(71) Applicant: Quora, Inc., Mountain View, CA (US)

(72) Inventors: Adam D'Angelo, Palo Alto, CA (US); Charles Duplain Cheever, Palo Alto, CA (US); Rebekah Marie Cox, Mountain View, CA (US)

(73) Assignee: Quora, Inc., Mountain View, CA (US)

( * ) Notice: Subject to any disclaimer, the term of this patent is extended or adjusted under 35 U.S.C. 154(b) by 0 days.

(21) Appl. No.: 18/541,891

(22) Filed: Dec. 15, 2023

(65) Prior Publication Data

US 2024/0135834 A1    Apr. 25, 2024

Related U.S. Application Data

(63) Continuation of application No. 18/068,545, filed on Dec. 20, 2022, now Pat. No. 11,881,122, which is a continuation of application No. 17/235,562, filed on Apr. 20, 2021, now Pat. No. 11,562,660, which is a continuation of application No. 12/983,061, filed on Dec. 31, 2010, now Pat. No. 11,017,685.

(51) Int. Cl.
*A63B 69/00* (2006.01)
*G09B 7/00* (2006.01)

(52) U.S. Cl.
CPC ...................................... *G09B 7/00* (2013.01)

(58) Field of Classification Search
CPC ....................................................... G09B 7/00
USPC ................................ 434/322, 323, 350, 365
See application file for complete search history.

(56) References Cited

U.S. PATENT DOCUMENTS

| 7,957,510 | B2 | 6/2011 | Denney et al. |
| 2006/0240851 | A1 | 10/2006 | Washburn |
| 2011/0302098 | A1 | 12/2011 | Yoshida et al. |

OTHER PUBLICATIONS

Office Action mailed Dec. 26, 2012 in U.S. Appl. No. 12/983,061.
Office Action mailed Jul. 12, 2013 in U.S. Appl. No. 12/983,061.
Notice of Allowance mailed Jul. 8, 2014 in U.S. Appl. No. 12/983,061.
Office Action mailed Sep. 16, 2014 in U.S. Appl. No. 12/983,061.
Office Action mailed Jul. 16, 2015 in U.S. Appl. No. 12/983,061.
Office Action mailed Jun. 29, 2018 in U.S. Appl. No. 12/983,061.
Office Action mailed May 3, 2019 in U.S. Appl. No. 12/983,061.
Office Action mailed Feb. 6, 2020 in U.S. Appl. No. 12/983,061.
Notice of Allowance mailed Jan. 22, 2021 in U.S. Appl. No. 12/983,061.
Notice of Allowance mailed Sep. 21, 2022 in U.S. Appl. No. 17/235,562.
Notice of Allowance mailed Sep. 18, 2023 in U.S. Appl. No. 18/068,545.

*Primary Examiner* — Kesha Frisby
(74) *Attorney, Agent, or Firm* — Polsinelli LLP

(57) ABSTRACT

A question-and-answer application that displays topic-specific biographical information about users when presenting certain content elements is described. The topic-specific biographical information for a user may be displayed in various contexts, such as with an answer to a question on a question page for the question, or with information identifying a user who is following a question or a topic. With some embodiments, a user's topic-specific biographical information may be provided by the user, provided or suggested by another user, or obtained from an external data source.

20 Claims, 12 Drawing Sheets

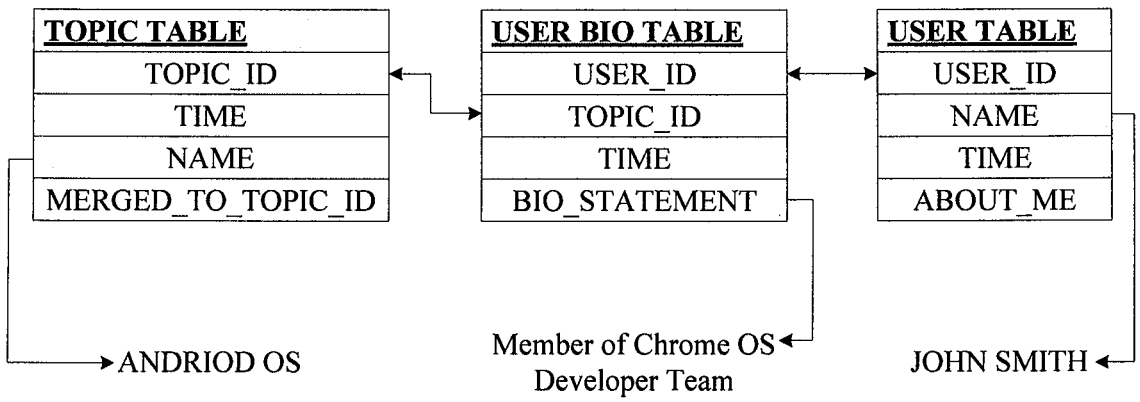
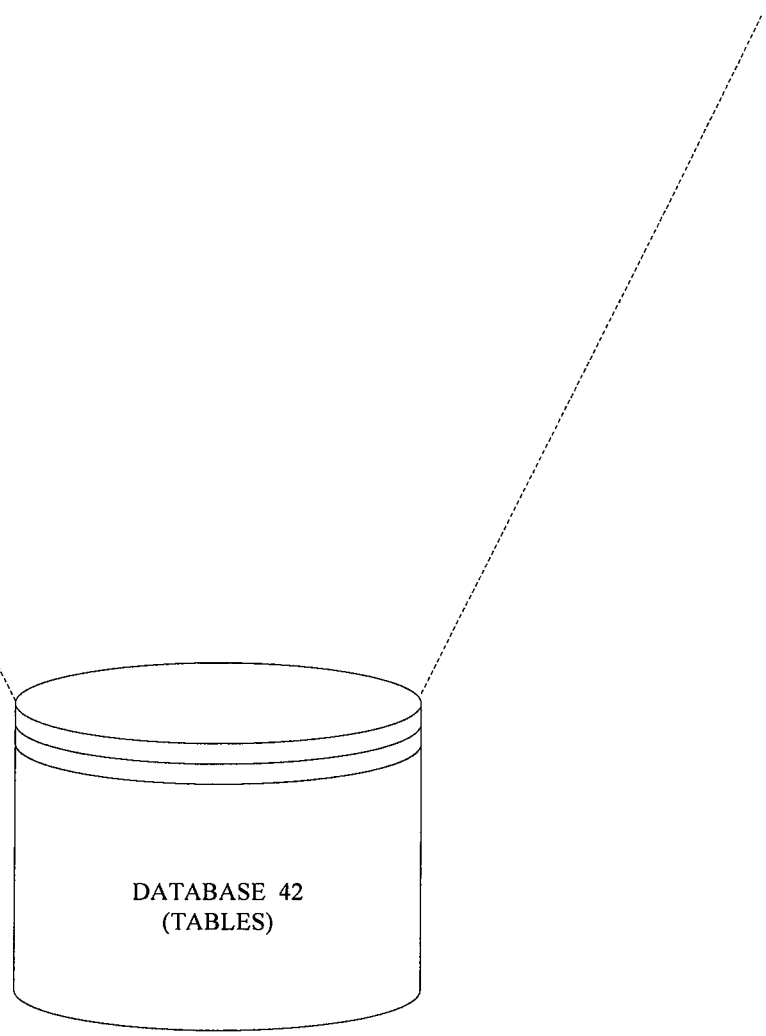
FIGURE 3

| | ADD QUESTION or SEARCH | |
|---|---|---|
| PREVENTIVE MEDICINE | | |
| Describe the Preventive Medicine topic | | |

| BROWSE | Open Questions (5) | Best Questions (1) | |
|---|---|---|---|
| LATEST ACTIVITY | Add your answer | Best Question | FOLLOW TOPIC |

Can you recommend a pediatrician in Menlo Park?
Fred added an answer – 12/5/2010 - Follow
Fred Johnson, Director of PAMF, child services Dr. John Carlson is accepting new patients and has been well received...

Can HIV be controlled with a new drug cocktail?
Question added – 12/3/2010

Where can I get a flu shot
Question added – 12/2/2010

Create an FAQ
Manage Topic
Organize Topic
All Changes

Your Topic Bio
Describe your Preventive Medicine — 132
experience

Top Answers – 78 Followers

John Smith
2 Answers

Kelley Jones
1 Answer; 5 Comments

Share Topic – Invite Users

[SN] Social Network  [In] Inbox  [E] Email

FIGURE 11

METHODS AND SYSTEMS FOR PRESENTING TOPIC-SPECIFIC BIOGRAPHICAL INFORMATION OF A USER

CROSS-REFERENCE TO RELATED APPLICATION

The present application is a continuation of U.S. patent application Ser. No. 18/068,545 filed Dec. 20, 2022, which is a continuation of U.S. patent application Ser. No. 17/235,562 filed Apr. 20, 2021, now U.S. Pat. No. 11,562,660, which is a continuation of U.S. patent application Ser. No. 12/983,061 filed Dec. 31, 2010, now U.S. Pat. No. 11,017,685, which are incorporated herein by reference in their entireties.

TECHNICAL FIELD

The present disclosure generally relates to data processing techniques. More specifically, the present disclosure relates to methods and systems for enhancing the quality of user-generated content for presentation via a question-and-answer service by presenting topic-specific biographical information about a user when presenting certain content elements related to the user.

BACKGROUND

Many on-line or web-based applications and services rely partially, and in some cases almost entirely, on user-generated content—that is, content generated by the end-users of the particular application or service. The success of such applications and services is heavily dependent upon the ability to attract and retain users who are willing to participate by generating content that is to be shared with other users. One particular type of application or service for which this holds true is an on-line question-and-answer service. In general, a question-and-answer service is a service that allows its end-users to post questions, post answers to questions, or simply browse the questions and answers that others have posted.

One of the ways that a user can assess the quality (e.g., accuracy, truthfulness, trustworthiness, etc.) of information, such as an answer that has been provided to a particular question, is to assess the source of the information. However, many question-and-answer services provide little more than the name of a person who has provided an answer to a question. This limits a user's ability to gain any insight into the quality of the information provided with an answer, particularly when the user who provided the answer is unknown to the user viewing the answer. A question-and-service may provide a link to a user's profile page, allowing a user browsing a particular answer to retrieve biographical information about a user who provided the answer. However, this generally requires that a user browsing an answer leave the current web page displaying the answer and load a new web page with the biographical information of the user who provided the answer. In addition, such an approach can be burdensome to the browsing user because it requires the user to wade through the entire profile of the user who provided the answer, and much of the profile may be irrelevant for purposes of assessing the quality of the answer.

DESCRIPTION OF THE DRAWINGS

Some embodiments of the invention are illustrated by way of example, and not limitation, in the figures of the accompanying drawings, in which:

FIG. 3 is a diagram illustrating some example data structures—in the form of database tables—for use in implementing topic-specific biographical statements for use with a question-and-answer service, according to some embodiments of the invention;

FIGS. 8 through 11 are user interface diagrams illustrating examples of user interfaces for use with a question-and-answer application consistent with some embodiments of the invention.

DETAILED DESCRIPTION

Figure 1:
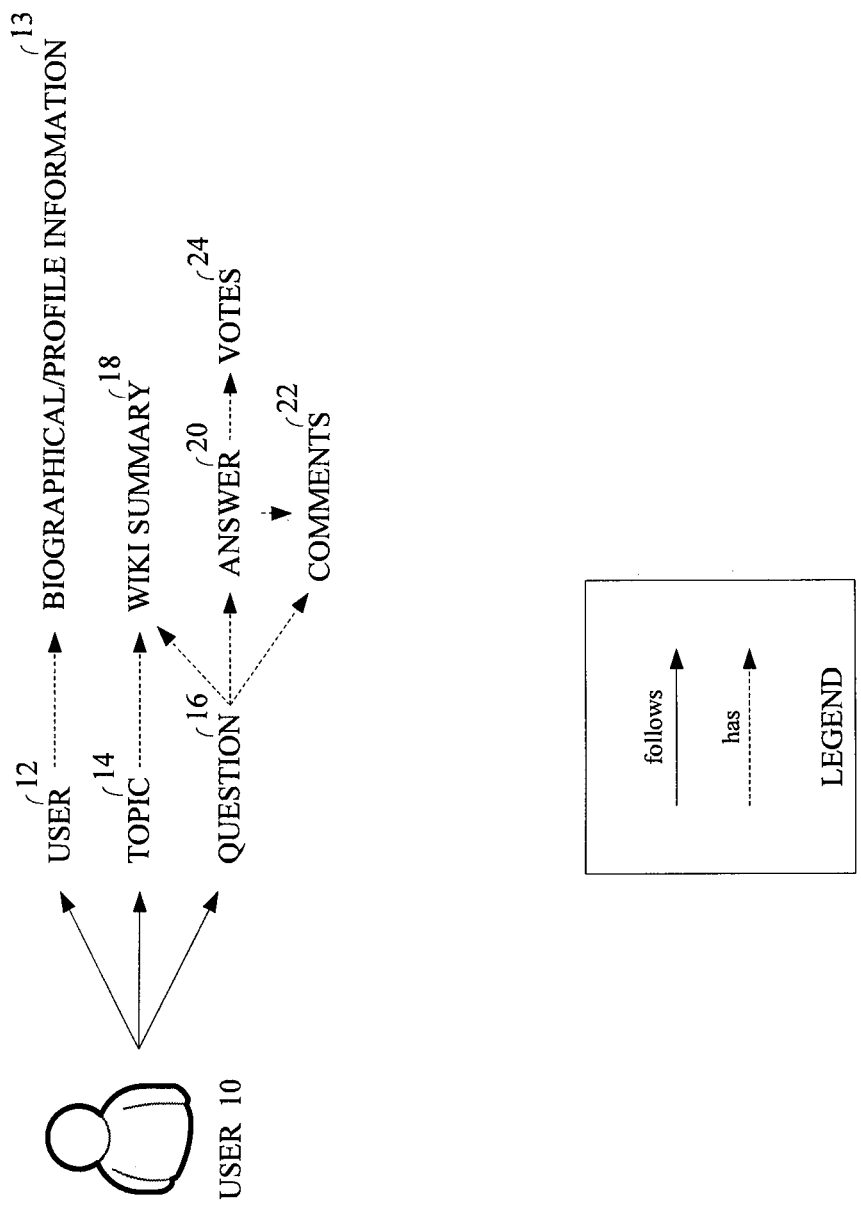
FIG. 1 is a simple relationship diagram illustrating how some of the various elements and participants of a question-and-answer application are related to one another in a particular embodiment of the invention.

Methods and systems for obtaining and displaying topic-specific biographical information about a user of a question-and-answer service are described. In the following description, for purposes of explanation, numerous specific details are set forth in order to provide a thorough understanding of the various aspects of different embodiments of the present invention. It will be evident, however, to one skilled in the art, that the present invention may be practiced without these specific details.

A question-and-answer application or service provides an on-line forum where users can post questions, post answers to questions, or simply search for and review questions and answers that others have posted. As such, a question-and-answer application is an information repository of user-generated content that is organized and presented in a relatively simple and intuitive manner. For purposes of the present disclosure, an individual web page showing all questions related to a particular topic may be referred to as a topic page, whereas a web page showing an individual question and any associated answers to the question, will generally be referred to herein as a question page. Finally, a page that shows profile information about a particular user is referred to herein as a user profile page, or simply, a profile.

With some question-and-answer services, content is structured to a certain extent, by explicitly assigning questions and/or answers to various topics. For example, to aid in the overall organization and presentation of information, a question might be assigned to one or more topics representing, for example, a subject matter to which the question relates. Take for example the question, "What is the population of San Francisco?" This question may be assigned to the topic, "San Francisco." With some embodiments, as users post questions for others to answer, users can designate each question as being related to one or more existing topics, or users can create and designate new topics. In some embodiments, any user may be free to assign a content item, such as a question or a biographical statement of a user, to a particular topic. Alternatively, in some embodiments, only designated users or administrators may have the required permissions or assigned roles necessary for assigning questions to particular topics. For purposes of the present disclosure, a content item (e.g., a question or a biographical statement) is said to have been assigned to a topic when the topic has been explicitly designated by a user or administrator.

The extent to which the content of a question-and-service is structured may vary considerably from one implementation to the next. For instance, with some question-and-answer services, questions and answers may not be explicitly assigned to topics. However, analysis of the text of a question or answer, as well as analysis of certain meta-data associated with a question or answer, may allow the question-and-answer service to infer one or more topics with which a question or answer is associated. For example, the question, "What is a good introductory book for learning Java programming?" might be associated with the topic, "Java (computer programming)" as a result of the question including the word, "Java." Similarly, analysis of the text and meta-data associated with one or more answers to a question may allow the question-and-answer service to infer one or more topics with which the question is associated. With some embodiments of the invention, the question-and-answer service may perform textual analysis of the text of certain content items (e.g., questions and biographical statement in particular) to determine the topics with which the content items are associated. For purposes of the present disclosure, a content item is said to be associated with a topic, when the topic is inferred from analyzing the text of the content item and any meta-data associated with the content item.

Consistent with embodiments of the invention, a question-and-answer service presents topic-specific biographical information about a user when presenting web pages including certain content elements, for example, such as an answer to a question that has been provided by the user. For example, a question page generally displays the text of a question that has been posted by a user along with a list of user-provided answers to the question. To enable users who are viewing the answers to assess the source and quality of the answers, the name of each person who provided an answer may be displayed next to his or her answer. In addition to displaying the user's name next to his or her answer, the question-and-answer service selects a particular portion of the user's biographical information to display in connection with (e.g., next to, or, near) the user's answer. The biographical information of the user is generally selected for being relevant with respect to a topic to which the question and answer relate.

For example, if a question on a question page has been explicitly assigned to the topic "Basketball", when a user provides an answer to the question, some portion of the user's biographical information relevant to that user's experience with the topic "Basketball" is selected and displayed next to the user's answer. Similarly, if a question on a question page has been explicitly assigned to the topic "Venture Capital", when the user provides an answer to the question, some portion of the user's biographical information relevant to the user's experience with the topic "Venture Capital" will be displayed in connection with his or her answer. With some embodiments, the question-and-answer service may infer one or more topics with which a question is associated, based on an analysis of the text of a question, an analysis of the text of one or more answers to the question, and/or the analysis of some meta-data associated with a question and/or answers. Displaying topic-specific biographical information of a user when presenting various content elements (e.g., such as a question provided by a user) not only allows users who are browsing questions and answers to assess the trustworthiness of an answer based on relevant information concerning the provider of the answer, but it also eliminates the need for a user who answers a lot of questions to provide biographical information about him or herself with each and every question that the user answers.

Consistent with some embodiments of the invention, the topic-specific biographical information for a user may be displayed in a variety of contexts. For example, a topic-specific biographical statement may be displayed with an answer provided by a user, when that answer is displayed in a question page. In such a scenario, the particular topic-specific biographical statement will be selected for its relevance or relationship to the topic of the question on the question page. So, for example, if the question is assigned to the topic, "Basketball", the biographical statement related to a user's experience with the topic "Basketball" will be displayed next to his or her answer. Similarly, a topic-specific biographical statement may be displayed along with a comment that a user has provided. Here again, the biographical statement will be selected for its relevance or relationship with respect to the topic of the question to which the comment relates.

Topic-specific biographical information may also be displayed in other scenarios as well. For instance, in certain contexts, a web page may include information about the particular users who are following a question, or a topic. For instance, a question page may include information about the particular users who are following the question that is shown on that question page. In addition to showing the individual users who are following the question, topic-specific biographical information about each user following the question may be displayed as well. This allows a user browsing a question page to identify other users who may have expertise concerning certain topics. Accordingly, if a user browsing a question page identifies another user who, based on his or her biographical information, seems interesting to the browsing user, the browsing user can elect to follow that user. Similarly, a topic page may present information about the various users who are following a topic. In addition to showing who (i.e., which users) are following the topic, the topic page may display topic-specific biographical information about the users who are following the topic. A user who is browsing a topic page because of an interest in the topic may elect to follow one or more of the other users who are also following the topic of the topic page. As such, the topic-specific biographical information that is displayed about a user not only allows a browsing user to assess the quality of any information that is provided by a user, but also serves a discovery purpose by enabling browsing users to discover other potential sources of relevant information about a particular topic. Other aspects and advantages of the inventive subject matter described herein will be readily apparent to skilled artisans from the description of the figures that follows.

FIG. 1 is a simple relationship diagram illustrating how some of the various elements and participants of a question-and-answer application are related to one another in a particular embodiment of the invention. For instance, as illustrated in FIG. 1, a user 10 of the question-and-answer application may follow another user 12, a topic 14, or a question 16. As used herein, the concept of "following" is somewhat analogous to the concept of subscribing in a subscription-based model. When a user follows another user, there is no implied personal relationship between the two users. For instance, a first user may follow a second user simply because the first user believes the second user is particularly insightful with respect to a particular topic of interest. By "following" another user, a user can be automatically informed of activities of the other user. If, for example, user A is following user B, when user B posts a question or an answer to a question, user A will be notified of user B's posting activity. Similarly, if a user elects to follow a particular topic, as new questions are assigned to the particular topic, the user can be automatically notified of these new questions. In yet another example, if a user follows a particular question, as new answers are posted to the particular question, the user will be notified of the new answers.

The concept of "following" may be thought of as a unilateral relationship, because it can be achieved at the desire of only one user. This is in contrast to the concept of two users being "connected" (e.g., in a social networking context), which typically implies a personal relationship between the users. Two users may be "connected" when each user is following the other—a bilaterally defined relationship. In some embodiments of the invention, the enabled features and interactions that the users are allowed to have with one another may be controlled to some extent by the type of relationship that exists between users, as that relationship is defined by the question-and-answer service, or some externally-hosted social network service. For instance, with some embodiments, a user may be able to provide or suggest a topic-specific biographical statement for another user when the two users are "connected"—that is, each user is following the other. Accordingly, at least with some embodiments, this feature is enabled with respect to two users only when a system-defined relationship exists between the two users.

As illustrated in FIG. 1, each user may have biographical information 13 that is part of the user's profile. A user may elect to make his or her profile information public, such that it can be viewed by other users on a user profile page. Alternatively, a user may elect to keep his or her profile information private. As will be described in greater detail below, each user's biographical information may be associated with certain topics. More specifically, a user's biographical information may consist of individual items of information, and each item of information may be assigned to one or more topics. Accordingly, the particular portion of a user's profile or biographical information that is displayed in a particular context may be dependent upon the context and the particular topic to which the user's biographical information is assigned. For example, when a user answers a question, some portion of the user's biographical information that is assigned to a topic to which the question has previously been assigned will be displayed next to the user's answer. Similarly, if a user provides a comment to another user's answer or comment, some portion of the user's biographical information assigned to the topic of the question that is being answered will be displayed next to the user's comment. With some embodiments, a user's biographical information may not be explicitly assigned to various topics, but the question-and-answer service may determine one or more topics with which the biographical information is associated, based on an analysis of the text of a biographical statement, and any associated meta-data.

In some embodiments of the invention, notifications may be communicated to a user by simply including the relevant content in a landing page or data feed displayed to the user. For example, when a user first provides his or her authentication information (e.g., username/password), the user may be presented with a personalized home page or landing page with content that is customized for the user. This content may be selected to include information regarding the users, topics and questions that the particular user is following. Additionally, in some embodiments, notifications may be communicated in near real-time to a user via any number of messaging mechanisms, to include a real-time dynamic data feed (e.g., web page) updates, email, SMS or text messages, instant messages, and others. In some embodiments, a user may elect to be notified of certain activities or events on a per-question, per-topic or per-user basis. For instance, a user may elect to receive a notification when a new answer is posted to a particular question that the user is following. When a first user suggests a topic-specific biographical statement for a second user, a notification message may appear to notify the second user about the topic-specific biographical statement that has been suggested by the first user.

Referring again to FIG. 1, a topic 14 may have a wiki summary 18 that provides a summary or some additional description of what subject matter is encompassed by the particular topic. Similarly, a question 16 may have a wiki summary 18 that provides some description or additional context for the question. In some embodiments, the wiki summary 18 for topics and questions may be user-editable by all users, while in other embodiments, only certain users will have the authority to edit a wiki summary. For instance, in some embodiments, only the person who posted a particular question may be authorized to edit the wiki summary for that particular question. In some embodiments, users may be assigned roles that determine various content or access privileges the users have with respect to different topics or questions. For instance, certain users may be assigned an "editor" role for a particular topic, thereby providing those users with editing privileges that are different from those of a regular user.

In addition to a wiki summary 18, a question 16 is associated with one or more answers 20. For instance, after a user posts a question, other users of the application are able to provide answers to the question. In some embodiments of the invention, any user is allowed to post an answer to a particular question. As such, a question may be associated with or have multiple answers. In some embodiments, both questions 16 and answers 20 may have comments. For instance, a user may provide a textual comment that is associated with a question 16 or an answer 20. A comment associated with an answer, for example, could provide some clarification about a particular answer, or some aspect of the answer. Other users can then view the comments when viewing the question and/or answers.

In some embodiments of the invention, an answer 20 has or is associated with votes 24. For example, users can vote up or vote down a particular answer based on whether the user finds the answer helpful in view of the particular question. For instance, if a user believes that a particular answer to a question is a good answer, the user can select a button or other graphical user interface element to vote for the answer. Similarly, if a user believes that a particular answer is not helpful in light of the question, the user can vote down the answer, for example, by simply selecting a button or other graphical user interface element to indicate that the answer is not helpful. In some embodiments, the number of votes for and against an answer are used as inputs to an algorithm that determines how answers are to be displayed when presented to a user. For example, the votes for and against an answer may simply be tallied, such that a vote for the answer offsets a vote against the answer, and the answers with the highest vote tallies are displayed in the most prominent positions—typically, at the top of a list of relevant answers.

By providing a forum that includes questions, answers, comments and votes, the question-and-answer application encourages meaningful discussion about a whole host of subject matters, in part, by enabling users to interact with the application in a variety of ways. For instance, some users may desire an entirely passive experience, and can therefore simply browse for, and read, questions and answers on topics of interest. Some users may desire an experience including a moderate level of participation, and as such, these users can vote up or down various answers on topics of interest, and possibly provide commentary. Others may desire to participate more actively, and will elect to post questions and answers to questions.

Figure 2:
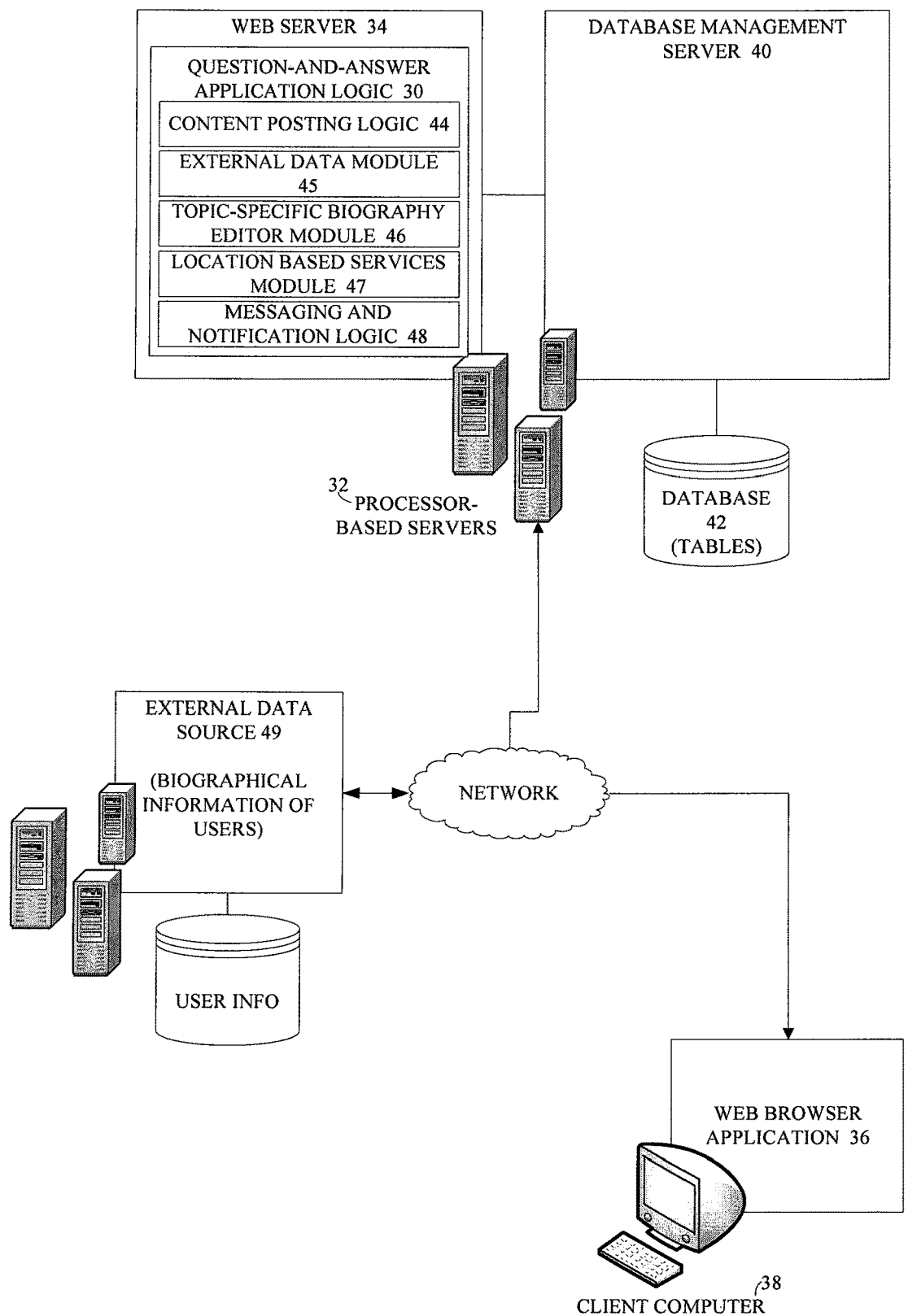
FIG. 2 is a system-level block diagram illustrating some of the system components and functional modules used in implementing a question-and-answer application that includes the ability to obtain and display topic-specific biographical information for a user, consistent with an embodiment of the invention.

FIG. 2 is a system-level block diagram illustrating some of the system components and functional modules used in implementing a question-and-answer application that includes the ability to obtain and display topic-specific biographical information for a user, consistent with an embodiment of the invention. As illustrated in FIG. 2, in some embodiments, a question-and-answer application is implemented as a web-based application having application logic 30 residing at one or more processor-based computer servers 32. At least some of the servers 32 include a web server 34 component for serving data (e.g., documents or web pages) to a conventional web browser application 36 residing and executing at a client computer 38. In addition, or as an alternative, the web server 34 may utilize one or more web-based protocols to serve content to non-web browser clients, such as a web-based mobile application residing and executing on a mobile device, a set top box, or some other computing device.

As illustrated in FIG. 2, a client computer 38 executes a web browser application 36 to access the web-based question-and-answer application. In various alternative embodiments, the client computer 38 may be a mobile computing device, to include: a laptop, mobile phone or tablet computer. As such, in some embodiments, the application may have an interface that is customized for display in a browser, or mobile application, of a mobile device. Furthermore, with some embodiments, the client-based application may not be browser-based, but instead may be customized to suit the particular operating system of the device on which it is executing. For instance, a customized application may utilize one or more application programming interfaces that are unique to the particular device and operating system on which the customized application resides and executes.

The question-and-answer application logic 30 is shown in FIG. 2 to include content posting logic 44, an external data module 45, a topic-specific biography editor module 46, a location-based services module 47, and messaging and notification logic 48. In general, the content posting logic 44 enables users to post questions, answers and comments, as well as other information and related content items. As described in greater detail below, the topic-specific biography editor module 46 facilitates some of the various functionality associated with obtaining topic-specific biographical information about the users of the question-and-answer service. For instance, the editor module 46 operates in conjunction with the content posting logic 44 to enable users to add, delete and edit their biographical information. With some embodiments, the editor module 46 operates on a per-topic basis, such that users can provide a biographical statement that is assigned to a particular topic, and is to be displayed in certain contexts with content items that are assigned to, or associated with, a corresponding topic. With some embodiments, the editor module 46 operates on a per-question basis, such that a user can enter a specific biographical statement to be displayed in connection with a particular question. In other embodiments, the topic editor 46 may be invoked to allow a user to provide a biographical statement to be displayed in other contexts, such as a particular occurrence of the user's name being presented. Furthermore, in some embodiments, the editor module 46 can be used to allow a user to suggest one or more topic-specific biographical statements for another user.

The messaging and notification logic 48 operates in conjunction with the content posting logic 44 and the editor 46 to facilitate the generation and communication of messages and notifications. For instance, if a first user provides a suggested biographical statement for a second user, the second user will receive a notification or message, delivered by the messaging and notification logic 48, which notifies the second user of the suggested biographical statement provided by the first user.

Consistent with some embodiments, the external data module 45 operates to query one or more external data sources 49 for relevant biographical information about users of the question-and-answer service. For instance, the external data module 45 may utilize one or more application programming interfaces (APIs) to connect with an external data source having biographical information about users of the question-and-answer service. The external data source may be a social or business network service, an email service, or some other web-based service. In some embodiments, the external data module 45 queries one or more external data sources 49 for relevant biographical information, and then stores any retrieved information in a database 42. Accordingly, this information can be used when displaying topic-specific biographical information about users. In some embodiments, the external data module 45 may retrieve data from an external data source in real-time, as it is preparing a page to be displayed for a user. Depending upon the nature of the external data source, a user's permission (e.g., password) may or may not be required to access the external data source 49. The retrieved data may be automatically associated with one or more topics based on the structure and source of the data. Alternatively, the question-and-answer service may prompt a user to assign some retrieved biographical data to one or more topics.

With some embodiments, the question-and-answer service includes a location based services module 47. The location based services module 47 analyzes location information of users, and in some instances, may serve as a source of topic-specific biographical information about a user. For instance, many questions that are posted to the question-and-answer service have a geographical component. For example, the question "What are the five best restaurants in San Francisco?" is a question that relates to the city of San Francisco. Accordingly, if a user resides in the city of San Francisco, the user is more likely able to provide a quality answer to the question than is a user who lives in Florida, for example. Therefore, the location based services module may infer a user's location using location information, such as the Internet Protocol (IP) address of a user's computing device, and then display this location information with an item of content, such as a user's answer. With some embodiments, the location based services module 47 may leverage an external data source for various types of location information. Of course, the application logic 30 may include a number of other logical components to perform a variety of other tasks and functions beyond the immediate scope of the present inventive subject matter. As such, to avoid obscuring the inventive subject matter in unnecessary detail, these various functional components have not been included in FIG. 2.

In some embodiments, some of the various functional components of the question-and-answer application, including some of the various software modules, may be distributed across several server computers, providing application reliability and scalability. For instance, as illustrated in FIG. 2, the database management server 40 is shown to reside on a separate server computer. However, in other embodiments the database management server 40 might reside and execute at the same server as the application logic 30 and web server 34. In any case, the database management server 40 facilitates the writing and reading of data stored in tables of a database 42. In some alternative embodiments, other data structures may be utilized in addition to, or in place of, database tables.

Consistent with some embodiments, the question-and-answer service is a stand-alone service accessible via its own unique address (e.g., URL or URI). With some embodiments, the stand-alone service may leverage its own social layer, or a social layer provided by an externally-hosted social network service. Accordingly, various relationships between users, as determined or defined by the question-and-answer service or an externally-hosted social network service, may be utilized to customize the functionality and features of the question-and-answer service. For example, certain interactions between users may be controlled based on the relationships that exist between the users, as those relationships are defined by an externally-hosted social network service. Alternatively, with some embodiments, the question-and-answer service may be one of several applications or services that are associated with, and provided by, a social network service. For instance, the question-and-answer service may be accessible via the same address or domain by which users access a social network service, such that the question-and-answer service is hosted by the same entity providing the social network service.

FIG. 3 illustrates some example data structures—in the form of database tables—for use in implementing topic-specific biographical statements for use with a question-and-answer service, according to some embodiments of the invention. The database tables shown in FIG. 3 are provided as an example of one particular embodiment of the invention, and are not meant to limit the invention to any particular implementation. Accordingly, the exact arrangement of database tables shown in FIG. 3, including the naming conventions for tables and columns, are provided as examples and are meant to convey an understanding of the inventive subject matter, and one particular context in which the inventive subject matter might be implemented, without limiting the invention. Moreover, it will be readily appreciated by skilled artisans that various other tables (not shown in FIG. 3) might be utilized to implement various aspects of a question-and-answer application that are consistent with embodiments of the inventive subject matter described herein.

As illustrated in FIG. 3, there are three tables, including tables with the names, "TOPIC_TABLE" 50, "USER_BIO_TABLE" 52, and "USER_TABLE" 54. As shown in FIG. 3, the USER_BIO_TABLE 52 includes a field with the name, USER ID, for storing some type of identifier for a user, and a separate field, TOPIC_ID for storing an identifier for a topic. In addition, the USER_BIO_TABLE includes a field, BIO_STATEMENT, for storing individual topic-specific biographical information statements of a user. Accordingly, the USER_BIO_TABLE links the topics, as specified and stored in the TOPIC_TABLE, with users, as specified and stored in the USER_TABLE.

Figure 4:
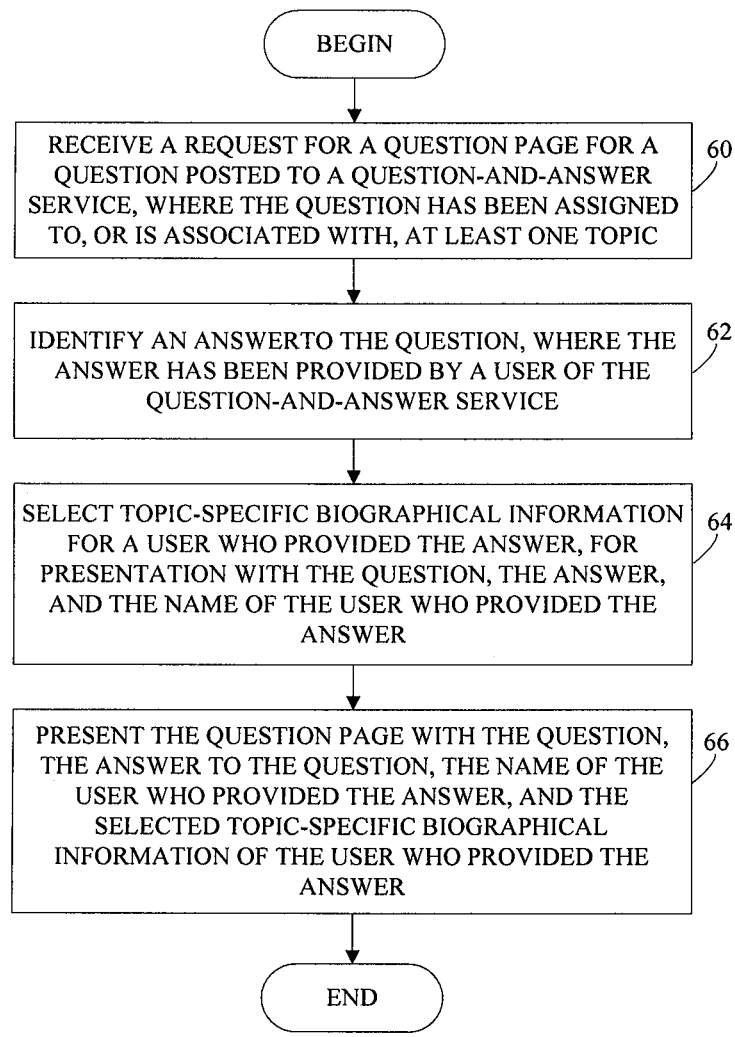
FIG. 4 is a flow diagram illustrating an example of a method consistent with some embodiments of the invention for presenting a question posted to a question-and-answer service, along with an answer provided by a user, and a topic-specific biographical statement for the user who provided the answer.

FIG. 4 illustrates an example of a method consistent with some embodiments of the invention for presenting a question posted to a question-and-answer service, along with an answer provided by a user, and a topic-specific biographical statement for the user who provided the answer. As illustrated in FIG. 4, the method begins at method operation 60 when the question-and-answer service receives a request for a question page for a question that has been posted to the question-and-answer service. In some embodiments, at the time the question page is requested, the question will have been previously assigned to at least one topic. Alternatively, with some embodiments, the question, or one or more answers associated with the question, will be analyzed to determine one or more topics with which the question is associated.

Next, at method operation 62, the question-and-answer service identifies an answer to the question. For example, the question-and-answer service may query a database table to select one or more answers to the question, where each answer was previously posted to the question-and-answer service by a user of the question-and-answer service. At method operation 64, the question-and-answer service selects a topic-specific biographical statement to be presented on the question page next to or near the name of the user who provided the answer to the question. Finally, at method operation 66, the question page is presented or served to the requesting client device, such that the question page includes the text of the question, at least one answer to the question, the name of the user who provided the answer to the question, and the selected topic-specific biographical statement of the user who provided the answer.

With some embodiments, selecting a topic-specific biographical statement of a user to be displayed with an answer to a question is a simple matter of identifying a biographical statement that has been explicitly assigned to a particular topic, such that the information is stored in a database in some manner that associates the biographical statement with one or more topics. However, with some embodiments, a user's biographical information may not be explicitly assigned to topics. As such, a user's biographical information and any available associated meta-data may be analyzed by the question-and-answer service to identify portions of the user's biographical information that are related to the topic with which the question is associated. This may occur in real-time, as a page request is being processed, or the analysis may occur prior to processing a page request.

Figure 5:
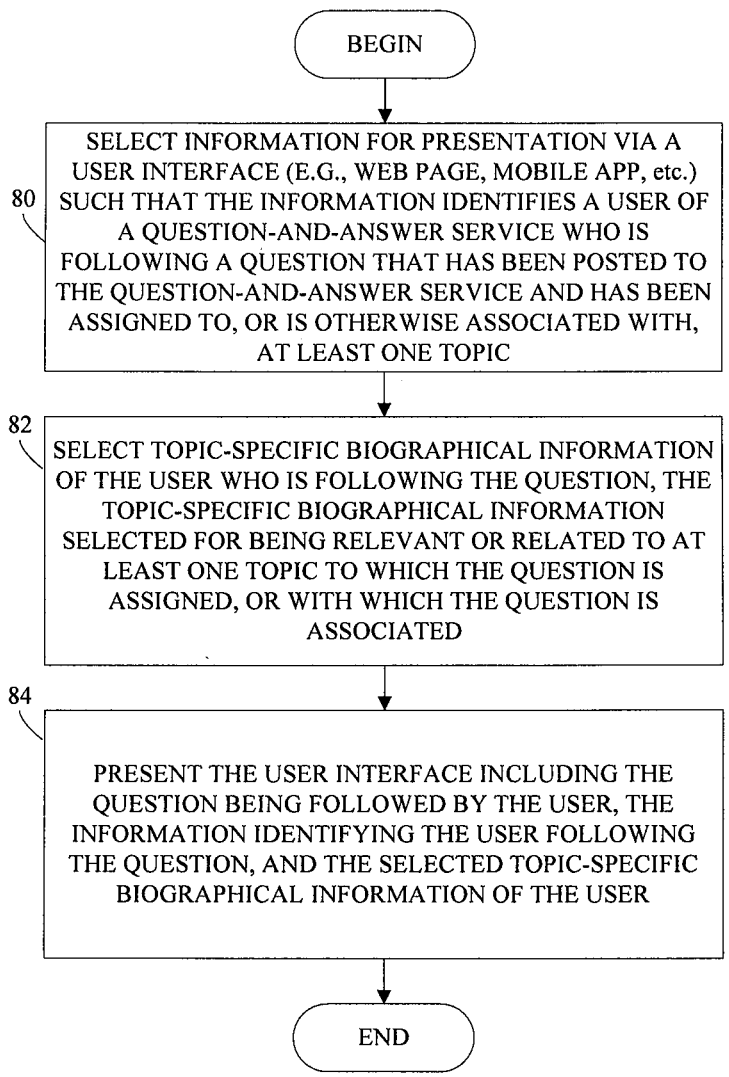
FIG. 5 is a flow diagram illustrating the method operations of a method for displaying topic-specific biographical information of a user when displaying information about a question that a user is following, according to some embodiments of the invention.

In addition to displaying topic-specific biographical information about a user when showing an answer provided by the user, the question-and-answer service may display topic-specific biographical information about users in a number of other contexts as well. For instance, FIG. 5 illustrates the method operations for a method of displaying topic-specific biographical information of a user when displaying information about a question that a user is following. For instance, the method begins at method operation 80 when the question-and-answer service selects information for presentation via a user interface of the question-and-answer service, such that the information identifies a particular user who is following a particular question that has either been explicitly assigned to a topic, or is otherwise determined to be associated with a topic. For example, on a question page, the photographs and/or names of users who are following the question may be presented.

Next, at method operation 82, the question-and-answer service selects topic-specific biographical information of a user who is following the question. The topic-specific biographical information is identified and/or selected for its relevance to, or relationship with, at least one topic to which the question being followed is assigned, or with which the question being followed is associated. For instance, with some embodiments, a user may explicitly assign a question to a topic. In other embodiments, the question-and-answer service may analyze the question and determine a topic with which the question is associated. Finally, at method operation 84, the question-and-answer service presents a user interface (e.g., a web page) showing the question that is being followed by a user, the information identifying the user that is following the question, and the selected biographical information about the user who is following the question. For example, if a user is following a question assigned to or associated with the topic, "Ice Hockey", a portion of the user's biographical information relating to his or her experience with the topic, "Ice Hockey" will be selected for presentation next to or near the information that indicates the user is following the question about ice hockey. This allows other users to quickly assess the user's biographical information and make a determination about whether the user whose biographical information is displayed might be worth following.

Figure 6:
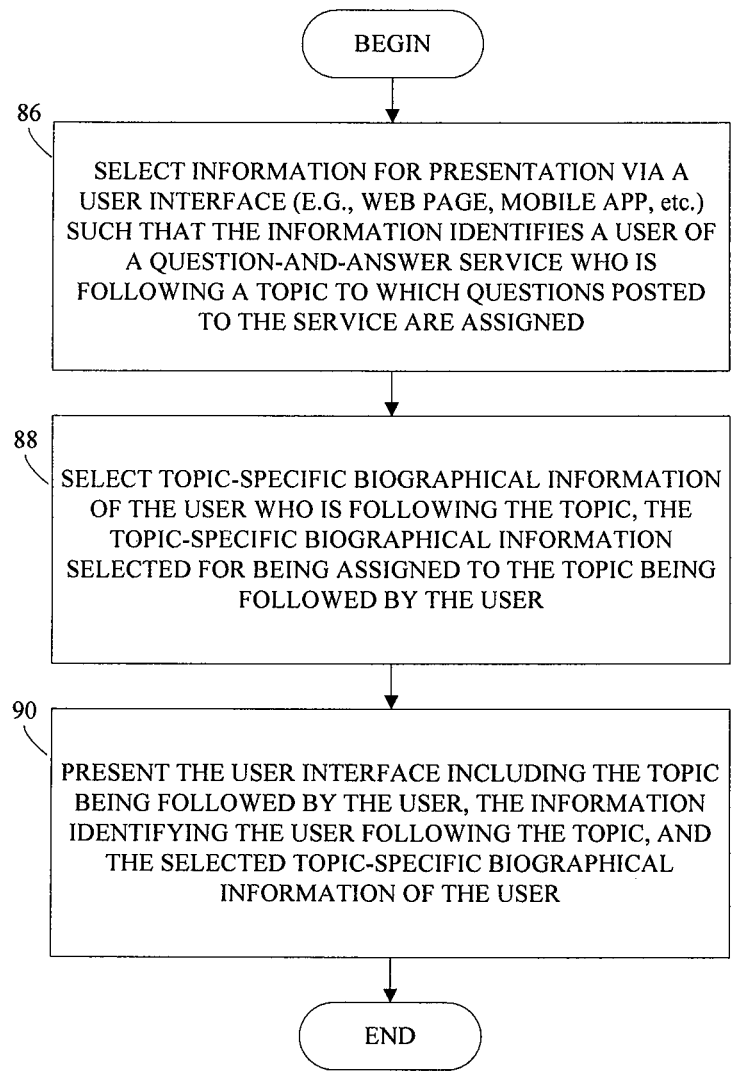
FIG. 6 is a flow diagram illustrating the method operations involved in a method of displaying topic-specific biographical information of a user when displaying information about a topic that the user is following, according to some embodiments of the invention.

In yet another example, FIG. 6 illustrates the method operations involved in a method of displaying topic-specific biographical information of a user when displaying information about a topic that the user is following. The method begins at method operation 86 when the question-and-answer service selects information for presentation via a user interface of the question-and-answer service, such that the information identifies a particular user who is following a topic. For example, on a topic page, the photographs and/or names of users who are following the topic may be selected for presentation.

Next, at method operation 88, the question-and-answer service selects topic-specific biographical information of the user who is following the topic. The topic-specific biographical information is selected for its relevance to the topic that the user is following. In some embodiments, the question-and-answer service may query an external data source in real-time for topic-specific biographical information of a user. Finally, at method operation 90, the question-and-answer service presents a user interface (e.g., a web page) showing the topic that is being followed by the user, the information identifying the user that is following the topic, and the biographical information about the user who is following the topic.

In many instances, a particular content item (e.g., a question) may be assigned to, or associated with, more than one topic. Accordingly, various algorithms and factors may be utilized in determining the specific biographical statement of a user that is displayed for the user, when the biographical statement is being presented in connection with a content item that has been assigned to, or is associated with, multiple topics. For example, when a content item, such as a question, has been assigned to several topics, selecting a biographical statement for a user to be presented may involve analyzing the overall amount of user activity associated with the respective topics, and choosing the biographical statement that is associated with the topic that has the most user activity, or the most recent user activity. Alternatively, with some embodiments, preference may be given to a topic that has the least number of followers, as compared with other topics assigned to, or associated with, the question. For instance, consider an example for which a particular question is assigned to, or associated with, the topics, "Sports" and "WNBA Basketball." In this example, the number of followers for the topic "Sports" is likely to be greater than the number of followers for the topic, "WNBA Basketball." Therefore, by selecting the topic with the fewest number of followers, the topic that most closely relates to the question is selected—in this example, "WNBA Basketball." Of course, with some embodiments, the algorithm for selecting a biographical statement of a user to be displayed with a question assigned to, or associated with, more than one topic, may involve a combination of weighted factors.

With some embodiments, topics may be organized in a hierarchical structure, such that topics have one or more levels of sub-topics. Accordingly, when selecting biographical information of a user to be presented, the biographical statement may be selected because it is assigned to, or associated with, a sub-topic of a topic to which a particular content item is assigned. For example, if a question has been assigned to the topics, "Sports", "NBA Basketball" and "NBA Basketball Players," assuming the topic, "NBA Basketball Player" is the lowest level sub-topic, any biographical information of a user assigned to this lower-level sub-topic would take preference over biographical information assigned to one of the higher level topics.

With some embodiments of the invention, there are a variety of ways that a topic-specific biographical statement might be added to a user's profile. For instance, from a user's personal profile page, a user may invoke a topic-specific biographical information editor to add, delete and edit biographical statements associated with any one or more of the topics that the user is following. On a topic page for a particular topic, a user can enter a topic-specific biographical statement for the topic, regardless of whether the user is following the topic. With some embodiments, a user can add a topic-specific biographical statement for another user at that user's profile page, or on other pages. With some embodiments, a user may specify a particular biographical statement for display on a per-question basis, or, for display with the user's name in some other particular context. As described in connection with the flow diagram of FIG. 7, with some embodiments, a user can add a topic-specific biographical statement for one or more topics assigned to a question when the user is providing an answer to the question.

Figure 7:
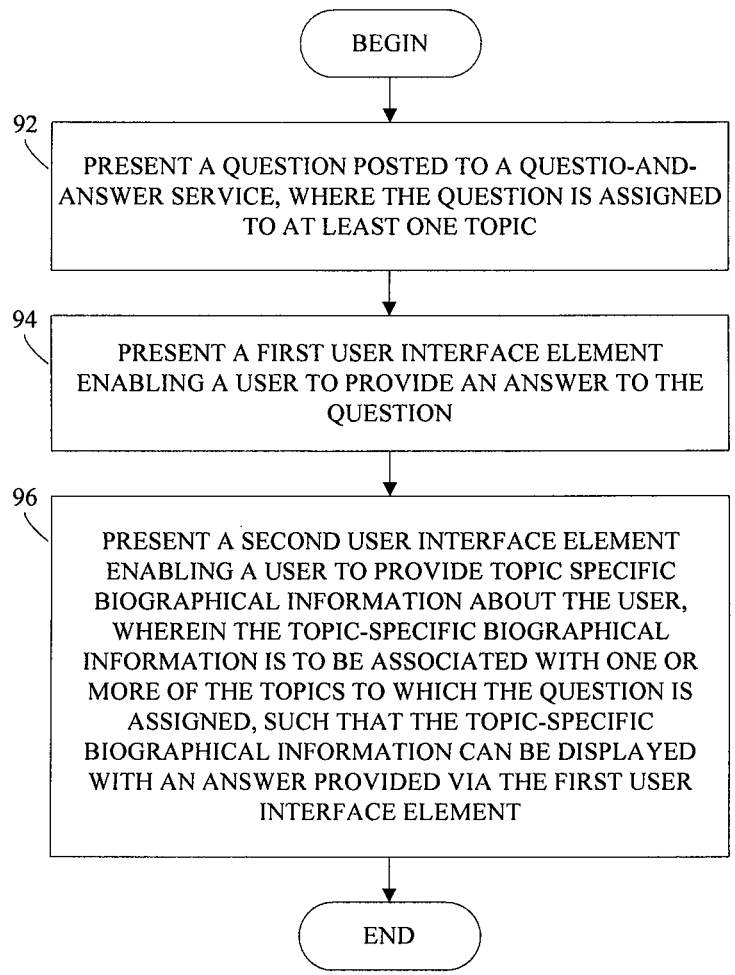
FIG. 7 is a flow diagram illustrating a method for enabling a user to provide a topic-specific biographical statement when providing an answer to a question that has been assigned to one or more topics, according to an embodiment of the invention.

For example, referring now to FIG. 7, at method operation 92 a question-and-answer service presents a question page with a question that has been posted by another user, such that the question has been assigned to one or more topics. In addition, at method operation 94, the question-and-answer service presents a user interface element, such as a text input box, where a user can provide an answer to the question. Finally, at method operation 96, the question-and-answer service presents another user interface element, such as a button or link, that, when selected, invokes a topic-specific biographical statement editor, allowing the user to enter a biographical statement for any one or more of the topics to which the question on the question page relates.

Figure 8:
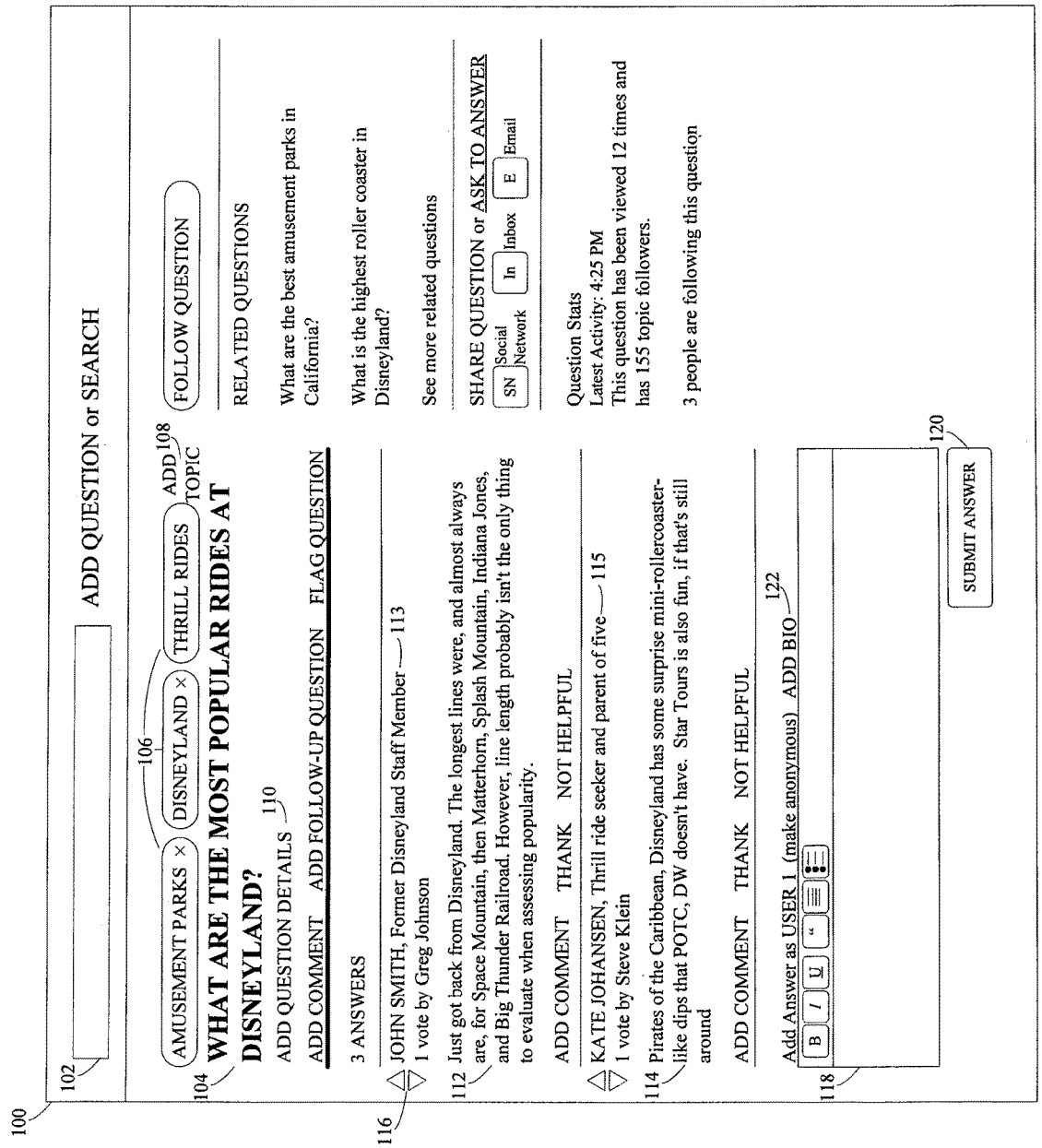

FIG. 8 is a user interface diagram illustrating an example of a user interface for use with a question-and-answer application consistent with an embodiment of the invention. The example user interface shown in FIG. 8 is provided to convey an understanding of the inventive concepts described herein, and a particular context in which the inventive subject matter might be implemented. It will be readily appreciated by skilled artisans that the user interfaCes illustrated herein are examples and that user interfaces differing from those illustrated herein may be applicable to the inventive concepts described herein.

As illustrated in FIG. 8, a header or banner section 100 is shown to include a text input box 102 where a user can enter a question, or alternatively, enter one or more keywords to be used in a search for a question, topic, user, or other item of content. Under the header section 100 is a portion of the user interface showing a question 104, and several topics 106 to which the question is currently assigned. For instance, in this example, the question is: "What are the most popular rides at Disneyland?" The topics 106 to which the question has been assigned include: "Amusement Parks", "Disneyland" and "Thrill Rides." Next to the topics is an "ADD TOPIC" link or button 108 enabling a user to add a new topic to be associated with the question 104. In addition, a separate button or link 110, shown in FIG. 7 with text "ADD QUESTION DETAILS" provides the user with the ability to enter additional details about the question. Separate buttons or links exist for other user functionality, such as adding comments about the question, adding a follow-up question and flagging the question, for example, as being inappropriate.

In this example user interface, beneath the question 104 are two answers 112 and 114 provided by two different users. Associated with each answer is a name of the user who posted the answer, along with a brief topic-specific biographical statement about each user who provided an answer. For example, the first answer 112 was posted by the user, John Smith, who, according to the topic-specific biographical statement 113, was a "Former Disneyland Staff Member." The second answer 114 was posted by Kate Johansen who, according to her topic-specific biographical statement, is a "thrill ride seeker and parent of five." Beneath each respective answer are buttons or links that enable a user to add a comment about an answer, or indicate that an answer was helpful or not helpful. In addition, to the left of each answer are two arrows for use in voting. For example, the arrow buttons (up and down) for the answer posted by John Smith are shown with reference number 116. The votes for and against an answer may be used in an algorithm that determines the order in which answers to a particular question are presented.

Figure 9:
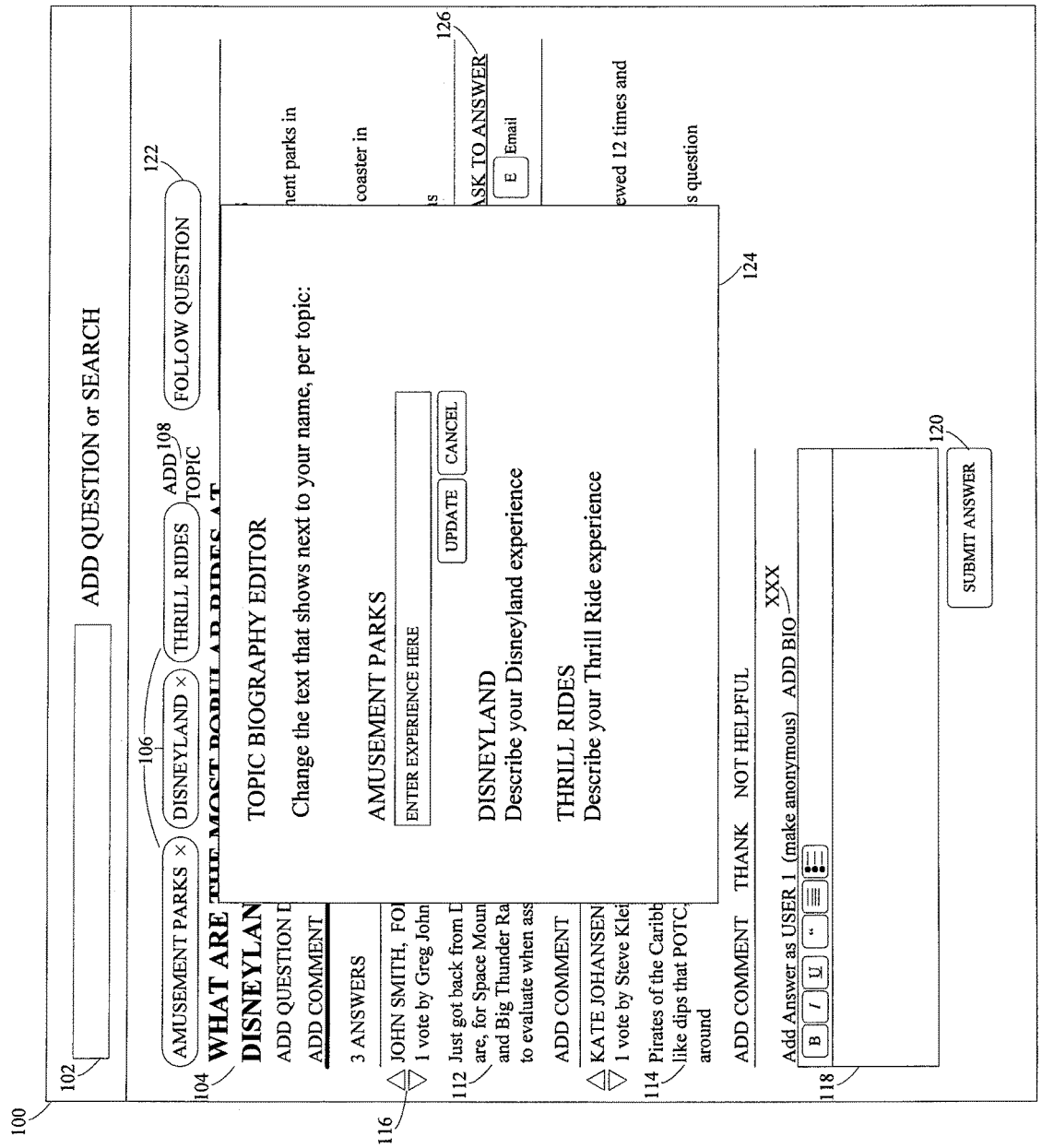

At the bottom of the example user interface in FIG. 8, there is a text input box 118 providing a user with the ability to submit a new answer to the question 104. For example, a user can type an answer in the text input box 118 and then hit the "SUBMIT ANSWER" button 120 to post the answer to the question-and-answer service. To make an answer anonymous, such that the posting user's name will not be displayed next to the answer, an anonymous button or link (e.g., labeled as "make anonymous" in FIG. 8) is provided. A button or link labeled, "ADD BIO" with reference number 122 allows the user to invoke the topic-specific biographical statement editor, to add, delete or edit a biographical statement assigned to any one or more of the topics to which the question is assigned. For example, by selecting the "ADD BIO" link 122, a user will be presented with an additional user interface for a topic-specific biographical statement editor, such as the window or dialogue box presented in FIG. 9 with reference number 126. As shown in FIG. 9, the user interface of the topic-specific biographical statement editor shows the topics to which the question is assigned—in this example, "AMUSEMENT PARKS", "DISNEYLAND" and "THRILL RIDES"—and, allows the user to add, delete, or edit a biographical statement for any one or more of the topics.

Figure 10:

FIG. 10 is a user interface diagram illustrating an example user profile page, consistent with some embodiments of the invention. With some embodiments of the invention, a user may be able to either provide a topic-specific biographical statement for another user, or alternatively, provide a suggested topic-specific biographical statement for another user. As shown in FIG. 10, by selecting the link or button labeled, "Suggest Topic-Specific Bio for Fred," with reference 130, a user can then add a biographical statement to be associated with a relevant topic. For example, with some embodiments, when a first user has a relationship with another user, such that the relationship satisfies some system-defined relationship requirement, the first user may be able to add a topic-specific biographical statement to another user's profile. This may be allowed, for example, only when the two users are following one another, or have established a connection, as defined by the question-and-answer service, or some external social or business network service. When the first user adds a topic-specific biographical statement for the second user, the second user will receive a message or notification indicating that the biographical statement has been added to his or her profile. With some embodiments, a user may only be able to suggest a biographical statement. Accordingly, after the first user suggests a topic-specific biographical statement for the second user, the second user will be notified, and will be prompted to accept, reject or edit, the suggested topic-specific biographical statement.

The example user interface shown in FIG. 10 is a user profile page that is being presented to a user other than the user showcased in the profile page. For instance, the profile page is for a user by the name of Fred Johnson. However, the profile page has been generated to be presented to a user other than Fred Johnson. With some embodiments, when a user is viewing his or her own profile page, a very similar user interface to that shown in FIG. 10 will be presented, allowing the user to add, delete or edit his or her own topic-specific biographical statements, for any topics that the user is following, and in some cases, even for topics that the user is not following.

FIG. 11 illustrates a user interface for an example of a topic page, via which a user can add a topic-specific biographical statement concerning the topic of the topic page, consistent with some embodiments of the invention. As illustrated in FIG. 11, the topic page for the topic, "Preventive Medicine" includes a link or button labeled, "Describe your Preventive Medicine Experience," with reference number 132. By selecting this link, a user can add a topic-specific biographical statement that will be presented next to or near another content item when the context of the user interface involves some aspect of the topic, "Preventive Medicine." A user may be allowed to add a topic-specific biographical statement for a topic, even when the user is not following the topic.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules or logical components referred to herein may, in some example embodiments, comprise processor-implemented modules or logic.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Figure 12:
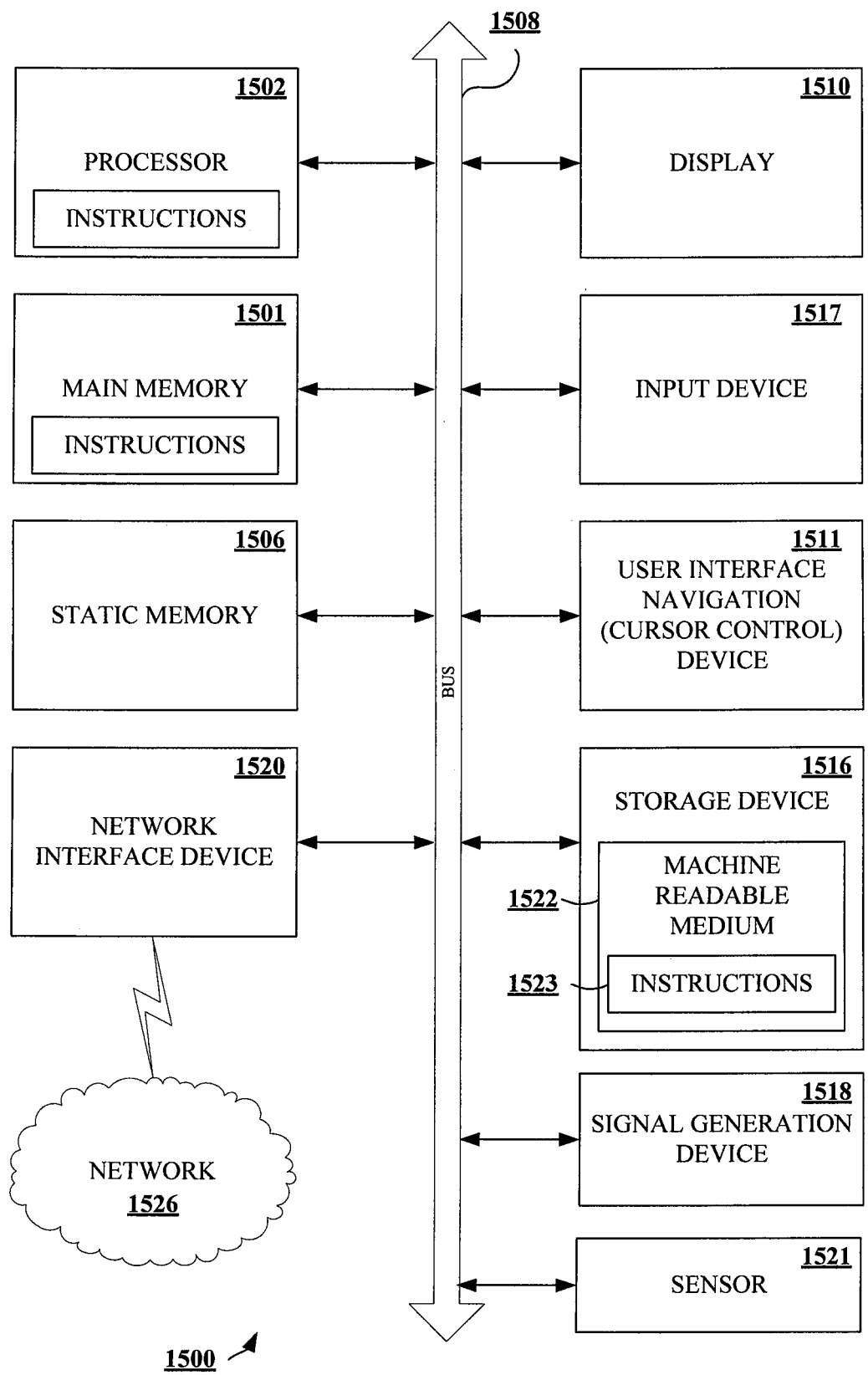
FIG. 12 is a block diagram of a machine in the form of a computer within which a set of instructions, for causing the machine to perform any one or more of the methodologies discussed herein, may be stored and executed.

FIG. 12 is a block diagram of a machine in the form of a computer within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environments, or as a peer machine in peer-to-peer (or distributed) network environments. The machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1501 and a static memory 1506, which communicate with each other via a bus 1508. The computer system 1500 may further include a display unit 1510, an alphanumeric input device 1517 (e.g., a keyboard), and a user interface (UI) navigation device 1511 (e.g., a mouse). In one embodiment, the display, input device and cursor control device are a touch screen display. The computer system 1500 may additionally include a storage device (e.g., drive unit 1516), a signal generation device 1518 (e.g., a speaker), a network interface device 1520, and one or more sensors 1521, such as a global positioning system sensor, compass, accelerometer, or other sensor.

The drive unit 1516 includes a machine-readable medium 1522 on which is stored one or more sets of instructions and data structures (e.g., software 1523) embodying or utilized by any one or more of the methodologies or functions described herein. The software 1523 may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1523 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A computer-implemented method comprising:
    receiving an identification of a topic of a question-and-answer service being tracked by a first user, wherein questions of the question-and-answer service are assigned to one or more topics;
    executing a biographical statement algorithm configured to link biographical statements associated with users to the topic;
    selecting a particular biographical statement associated with the first user following the topic; and
    displaying, a topic webpage to a second user, the topic webpage including, an identification of the topic, information identifying the first user, and the particular biographical statement associated with the first user.

2. The computer-implemented method of claim 1, wherein the topic webpage further includes a graphical representation of the first user.

3. The computer-implemented method of claim 1, further comprising:
    retrieving additional biographical information identified using data associated with one or more user profiles, wherein the particular biographical statement is further determined using the additional biographical information.

4. The computer-implemented method of claim 1, wherein the information identifying the first user includes a location associated with a user.

5. The computer-implemented method of claim 1, wherein the topic webpage includes an identification of one or more questions assigned to the topic.

6. The computer-implemented method of claim 1, wherein selecting a particular biographical statement associated with the first user is further based on user activity associated with a question assigned to the topic.

7. The computer-implemented method of claim 1, wherein the first user is different from the second user.

8. A non-transitory computer-readable storage medium including instructions that, when executed by one or more processors of a server hosting a question-and-answer service, cause the one or more processors to perform operations including:
    receiving an identification of a topic of a question-and-answer service being tracked by a first user, wherein questions of the question-and-answer service are assigned to one or more topics;
    executing a biographical statement algorithm configured to link biographical statements associated with users to the topic;
    selecting a particular biographical statement associated with the first user following the topic; and
    displaying, a topic webpage to a second user, the topic webpage including, an identification of the topic, information identifying the first user, and the particular biographical statement associated with the first user.

9. The non-transitory computer-readable storage medium of claim 8, wherein the topic webpage further includes a graphical representation of the first user.

10. The non-transitory computer-readable storage medium of claim 8, further comprising:
    retrieving additional biographical information identified using data associated with one or more user profiles, wherein the particular biographical statement is further determined using the additional biographical information.

11. The non-transitory computer-readable storage medium of claim 8, wherein the information identifying the first user includes a location associated with a user.

12. The non-transitory computer-readable storage medium of claim 8, wherein the topic webpage includes an identification of one or more questions assigned to the topic.

13. The non-transitory computer-readable storage medium of claim 8, wherein selecting a particular biographical statement associated with the first user is further based on user activity associated with a question assigned to the topic.

14. The non-transitory computer-readable storage medium of claim 8, wherein the first user is different from the second user.

15. A system comprising:
    one or more processors; and
    a non-transitory computer-readable storage medium including instructions that, when executed by the one or more processors, cause the one or more processors to perform operations including:
    receiving an identification of a topic of a question-and-answer service being tracked by a first user, wherein questions of the question-and-answer service are assigned to one or more topics;
    executing a biographical statement algorithm configured to link biographical statements associated with users to the topic;
    selecting a particular biographical statement associated with the first user following the topic; and
    displaying, a topic webpage to a second user, the topic webpage including, an identification of the topic, information identifying the first user, and the particular biographical statement associated with the first user.

16. The system of claim 15, wherein the topic webpage further includes a graphical representation of the first user.

17. The system of claim 15, further comprising:
    retrieving additional biographical information identified using data associated with one or more user profiles, wherein the particular biographical statement is further determined using the additional biographical information.

18. The system of claim 15, wherein the information identifying the first user includes a location associated with the first user.

19. The system of claim 15, wherein the topic webpage includes an identification of one or more questions assigned to the topic.

20. The system of claim 15, wherein selecting a particular biographical statement associated with the first user is further based on user activity associated with a question assigned to the topic.

* * * * *